2,885,289
METHOD FOR ENSILING FORAGE MATERIAL AND THE RESULTING PRODUCT

Georg Ludvig Busch, Copenhagen, Denmark

No Drawing. Application March 14, 1957
Serial No. 645,915

Claims priority, application Sweden March 16, 1956

8 Claims. (Cl. 99—8)

The present invention relates to improvements in the ensiling of forage materials. In one aspect it relates to ensiled forage materials containing a special ensiling agent and in another aspect to a method for ensiling such materials using this special ensiling agent.

The classical method for the preservation or ensiling of different kinds of forage plants, especially from pastures and hayfields, is the so-called A.I.V.-method according to which the ensiling or acidulation is effected by means of a mixture of strong acids (especially a mixture of hydrochloric acid and sulphuric acid). The use of relatively weak acids such as phosphoric acid and formic acid has also been suggested. However, the use of either strong or relatively weak acids in liquid state presents many difficulties, especially as the quantities to be used necessarily are very large, and the acids are corrosive and difficult to handle and store. It has recently been suggested to use solid ensiling materials, such as a mixture of sodium formate and free formic acid, mixtures of calcium formate and sodium nitrite, anhydrous chlorides or anhydrides of strong acids ($PCl_5$ and $SO_3$), chlorsulfonates ($NaClSO_3$), a mixture of various sodium, potassium and ammonium phosphates and sulphates and the like. While being somewhat more economic and easier to use and handle than liquid ensiling materials these dry materials still present several drawbacks. Thus in some cases the quantity necessary that must be used for obtaining the desired pH value in the ensilage, i.e. from about 3.5 to 4.5, is rather large some of the agents are very toxic and corrosive while others are hygroscopic and difficult to spread. One of the best agents is the combination of sodium, potassium or ammonium phosphates and sulphates but also in this case relatively large amount of salt, calculated upon the quantity of forage material to be ensiled, has to be used, as for instance 1 to 2% of the salt mixture where the forage material contains about 18 to 24% of total solids. Furthermore, the last-mentioned salt mixture is not very free-flowing, thus making the spreading thereof difficult, especially when the salt mixture has been stored during a prolonged period of time.

An object of the present invention is to avoid the above-mentioned disadvantages and to provide an economical and simple method for ensiling forage material of such as common field and ground plants, grass, clover, corn fodder, legumes, lucerne, alfalfa, mixtures thereof and other vegetable and animal forage materials, such as potatoes, root-crops and root-crops leaves, fish and meat waste and the like. Another object is to provide an ensilage which is stable, is free of toxic substances and is easy to handle. Still another object is to provide an ensilage having increased stability and an increased content of assimilable phosphorous.

The above-mentioned objects are achieved according to the present invention by using amidosulphonic acid as the ensiling agent. It has been found that by incorporating amidosulphonic acid with the forage material to be ensiled either in the form directly obtained at the harvest or after chopping or possibly wilting it is possible to obtain the desired pH-value in the ensilage, i.e. between about 3.5 and 4.5 and preferably between about 3.8 and 4.3. As is well-known in the art it is necessary in most cases to lower the pH-value at least below 4.5 in order to prevent the growth of undesired microorganisms. The pH-value is usually determined in the juice present in contact with the solids of the forage material.

Amidosulphonic acid, $NH_2SO_3H$, is non-expensive and is easy-available in the form of a free-flowing powder. This powder can be handled and used without any toxic effects and is not corrosive or hygroscopic and can be stored for a very long period of time without caking. The forage material ensiled according to the invention does not have any unfavorable influence on the health of the animals fed therewith; the amido sulfonic acid is hydrolyzed to ammonium bisulphate in an increasing amount corresponding to the storage duration.

In order to obtain the desired pH-value in the forage material it is sufficient to use a very small quantity of the amidosulphonic acid or about 0.05 to 0.5% by weight calculated upon the total weight of the forage material. The best results are usually obtained when incorporating with the forage material about 0.05 to about 0.25% by weight of the amidosulphonic acid. However, in some cases it might also be desired to add a quantity of more than 0.5% by weight of the amidosulphonic acid such as up to 1% by weight or even more whereas in other cases it might be sufficient with an even smaller quantity than 0.05% by weight of the amidosulphonic acid depending upon the forage material to be ensiled.

The incorporation of the amidosulphonic acid with the forage material may be made in several ways but ordinarily the amidosulphonic acid is simply added to the forage material, such as when this is moving on the belt of the silage cutter. The ensilage obtained is then packed into the silo in the usual manner. It is also very suitable to add the amidosulphonic acid directly to the forage material when this is packed into the silo for example by strewing or sprinkling the acid onto a layer of suitable thickness whereupon a new layer of forage material is placed upon the first layer and a new quantity of amidosulphonic acid is added, and so on.

Preferably the plants to be ensiled are harvested early and may then be pre-dried to about 30% of total solids before adding the amidosulphonic acid. However, such a procedure is not necessary as the acid may also be added to unchopped fresh forage material as is shown above.

According to a further embodiment of the invention it has been found that even better results can be obtained by using a mixture of dicalcium phosphates and/or other phosphates together with the amidosulphonic acid. Not only is the nutrient value, i.e. the content of assimilable phosphorous increased in this way but the storage stability of the amidosulphonic acid is also improved. The present invention therefore also encompasses the step of incorporating with the forage material as hereinbefore defined a mixture of amidosulphonic acid and dicalcium phosphates and other phosphates in such a quantity that the pH-value of the forage material is lowered to about 3.5 to 4.5 and preferably to about 3.8 to 4.3. The quantity of phosphates used may vary within wide limits inter alia depending upon the quantity of assimilable phosphorous already present in the forage material to be ensiled but it is ordinarily sufficient to use a quantity of about 25 to 200% by weight and preferably of about 50 to 100% by weight of the quantity of amidosulphonic acid used. The invention also comprises the ensilage obtained by the use of such a mixture of amidosulphonic acid and dicalcium phosphates and/or other phosphates.

The following examples illustrate but do not in any way restrict the scope of the invention.

*Example 1.*—In the packing of lucerne into a silo there was incorporated by strewing about 1 kgm. of amidosulphonic acid per 1 ton green weight of the fodder. The pH-value of the lucerne decreased to about 4 after one day's storing. After a storing period of three months the lucerne was still free from butyric acid fermentation and the content of lactic acid was determined to 1.8%. The preservation was excellent.

*Example 2.*—A mixture of green grass (40%), lucerne (30%) and alfalfa (30%) was ensiled by strewing onto the fodder 0.8 kgm. of amidosulphonic acid per 1 ton green weight of the fodder. The preservation obtained was excellent.

*Example 3.*—There was added to green grass fodder which had been harvested early and chopped about 1.2 kgms. of amidosulphonic acid. After packing into a silo the pH-value of the ensilage dropped to about 4 in 1 to 2 days and after three months' storing the ensilage showed no signs of butyric acid fermentation and the lactic acid content was very low.

*Example 4.*—A green fodder having a low phosphorous content was ensiled using 2 kgms. of a mixture of 50% by weight of amidosulphonic acid and of 50% by weight of dicalcium phosphate per 1 ton of green weight of the fodder. The preservation of the fodder was excellent and after two months of storing the fodder showed no signs of butyric acid fermentation.

What I claim is:

1. An ensiled forage material containing amidosulphonic acid in a quantity sufficient to provide a pH-value in the ensiled material of between about 3.5 and about 4.5.

2. An ensiled forage material containing amidosulphonic acid in the form of a free flowing powder and in a quantity of about 0.05 to about 1% by weight calculated upon the total weight of the ensiled material.

3. An ensiled forage material containing amidosulphonic acid in the form of a free-flowing powder and in a quantity of about 0.05 to about 0.25% by weight calculated upon the total weight of the ensiled material.

4. An ensiled forage material containing a mixture of amidosulphonic acid in the form of a free-flowing powder and at least one member of the group consisting of dicalcium phosphates and other phosphates.

5. A method for ensiling forage material which comprises incorporating with the forage material amidosulphonic acid in a quantity sufficient to provide a pH-value in the ensiled material of about 3.5 to about 4.5, inclusive.

6. A method for ensiling forage material which comprises incorporating with the forage material amidosulphonic acid in the form of a free flowing powder and in a quantity of about 0.05 to about 0.5% by weight calculated upon the total weight of the forage material.

7. A method for ensiling forage material which comprises incorporating with the forage material amidosulphonic acid in the form of a free-flowing powder and in a quantity of about 0.05 to about 0.25% by weight calculated upon the total quantity of the forage material to be ensiled.

8. A method for ensiling forage material which comprises incorporating with the forage material a mixture of amidosulphonic acid in the form of a free-flowing powder and at least one member of the group consisting of dicalcium phosphate and other phosphates.

References Cited in the file of this patent

UNITED STATES PATENTS 2,346,072     Haskell                Apr. 4, 1944

OTHER REFERENCES

Chem. Abst. 48: 9068 (1954).